United States Patent
Dong

(10) Patent No.: US 12,384,482 B2
(45) Date of Patent: Aug. 12, 2025

(54) ALL TERRAIN VEHICLE

(71) Applicant: SEGWAY TECHNOLOGY CO., LTD., Changzhou (CN)

(72) Inventor: Zhen Dong, Changzhou (CN)

(73) Assignee: SEGWAY TECHNOLOGY CO., LTD., Changzhou (CN)

(*) Notice: Subject to any disclaimer, the term of this patent is extended or adjusted under 35 U.S.C. 154(b) by 520 days.

(21) Appl. No.: 17/729,620

(22) Filed: Apr. 26, 2022

(65) Prior Publication Data

US 2022/0340229 A1  Oct. 27, 2022

(30) Foreign Application Priority Data

Apr. 27, 2021 (CN) .......................... 202110462187.7
Apr. 27, 2021 (CN) .......................... 202120889179.6

(51) Int. Cl.
  B62K 11/04  (2006.01)
(52) U.S. Cl.
  CPC .................................. B62K 11/04 (2013.01)
(58) Field of Classification Search
  CPC ...................................................... B62K 11/04
  USPC ........................................................ 180/198
  See application file for complete search history.

(56) References Cited

U.S. PATENT DOCUMENTS

2011/0240397 A1  10/2011  Shiina et al.
2018/0264928 A1  9/2018  Takaki et al.

FOREIGN PATENT DOCUMENTS

| CN | 102205862 A | 10/2011 |
| CN | 102530081 A | 7/2012 |
| CN | 110481683 A | 11/2019 |
| CN | 210391424 U | * 4/2020 |
| CN | 211685323 U | 10/2020 |

OTHER PUBLICATIONS

Chinese Office Action dated Apr. 1, 2025 for Application No. 202110462187.7, 17 pages.

* cited by examiner

*Primary Examiner* — Lindsay M Low
*Assistant Examiner* — Omar Morales
(74) *Attorney, Agent, or Firm* — Frost Brown Todd LLP

(57) ABSTRACT

An all terrain vehicle is provided and includes a vehicle frame, a front end of the vehicle frame being provided with a front axle, and a rear end of the vehicle frame being provided with a rear axle; a cushion arranged on the frame vehicle; an engine arranged on the vehicle frame and located below the cushion; a power motor arranged on the vehicle frame, the engine being drivingly connected to one of the front axle and the rear axle, the power motor being drivingly connected to the other of the front axle and the rear axle; a front wheel and a rear wheel, the front wheel being connected to the front axle, and the rear wheel being connected to the rear axle.

20 Claims, 3 Drawing Sheets

ALL TERRAIN VEHICLE

CROSS-REFERENCE TO RELATED APPLICATION

This application is based upon and claims priority to Chinese Patent Applications Serial No. 202120889179.6, 202110462187.7, filed on Apr. 27, 2021, the entire content of which are incorporated herein by reference.

FIELD

The present disclosure relates to a technical field of vehicles, and more particularly to an all terrain vehicle.

BACKGROUND

All terrain vehicle has good off-road performance, which is able to carry people or transport goods. In a related art, in order to ensure the off-road performance of all terrain vehicle and reduce its weight, it is necessary to design the vehicle with smaller size. Moreover, the all terrain vehicle has a high demand for power, and an essential technical problem of how to ensure the all terrain vehicle to be sufficient power while being limited in size needs to be solved by those skilled in the art. In addition, a relatively small size of the all terrain vehicle also leads to a limited mounting position for internal parts of the vehicle, uneven weight distribution of the vehicle and poor stability.

SUMMARY

The present disclosure aims to solve at least one of the technical problems in a related art to a certain extent.

According to a first aspect of the present disclosure, an all terrain vehicle is provided and includes a vehicle frame, a front end of the vehicle frame being provided with a front axle, and a rear end of the vehicle frame being provided with a rear axle; a cushion arranged on the frame vehicle; an engine arranged on the vehicle frame and located below the cushion; a power motor arranged on the vehicle frame, the engine being drivingly connected to one of the front axle and the rear axle, the power motor being drivingly connected to the other of the front axle and the rear axle; a front wheel and a rear wheel, the front wheel being connected to the front axle, and the rear wheel being connected to the rear axle.

According to a second aspect of the present disclosure, another all terrain vehicle is provided and includes a vehicle frame including an upper main beam frame, a lower main beam frame and a connecting beam connected between the upper main beam frame and the lower main beam frame, a front end of the vehicle frame being provided with a front axle, and a rear end of the vehicle frame being provided with a rear axle; a cushion being provided on the upper main beam frame; an engine located on the lower main beam frame and below the cushion, and the engine being drivingly connected to the rear axle; a power motor provided on the lower main beam frame and located in front of the cushion, the power motor being drivingly connected to the front axle; a front wheel and a rear wheel configured to support the vehicle frame; a front-half axle and a rear-half axle, the front-half axle being connected between the front axle and the front wheel, the rear-half axle being connected between the rear axle and the rear wheel.

DETAILED DESCRIPTION

Figure 1:
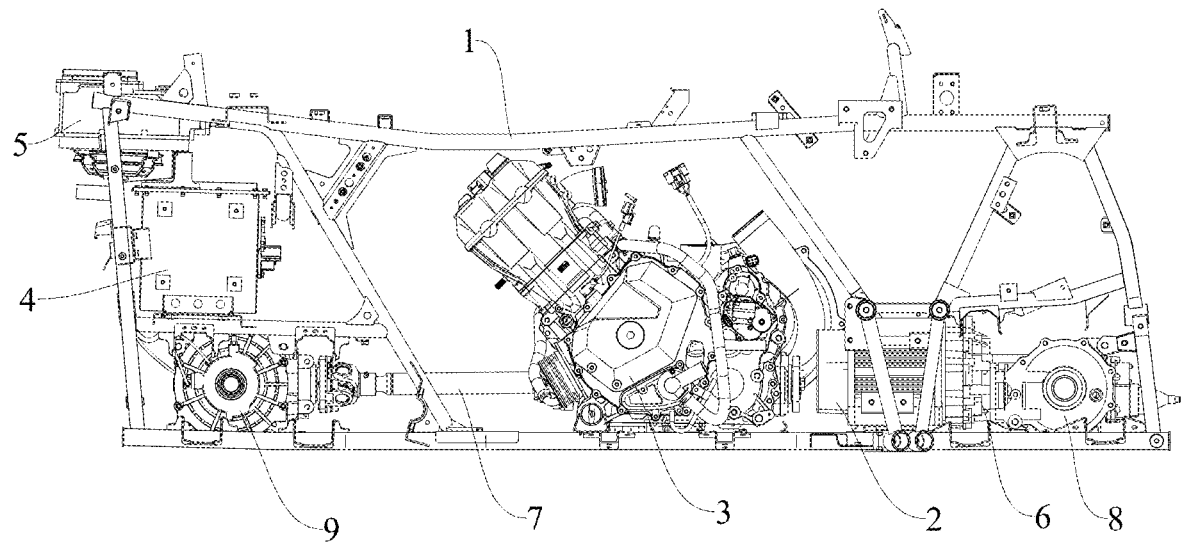
FIG. 1 is a schematic view of an all terrain vehicle according to an embodiment of the present disclosure.
Figure 2:
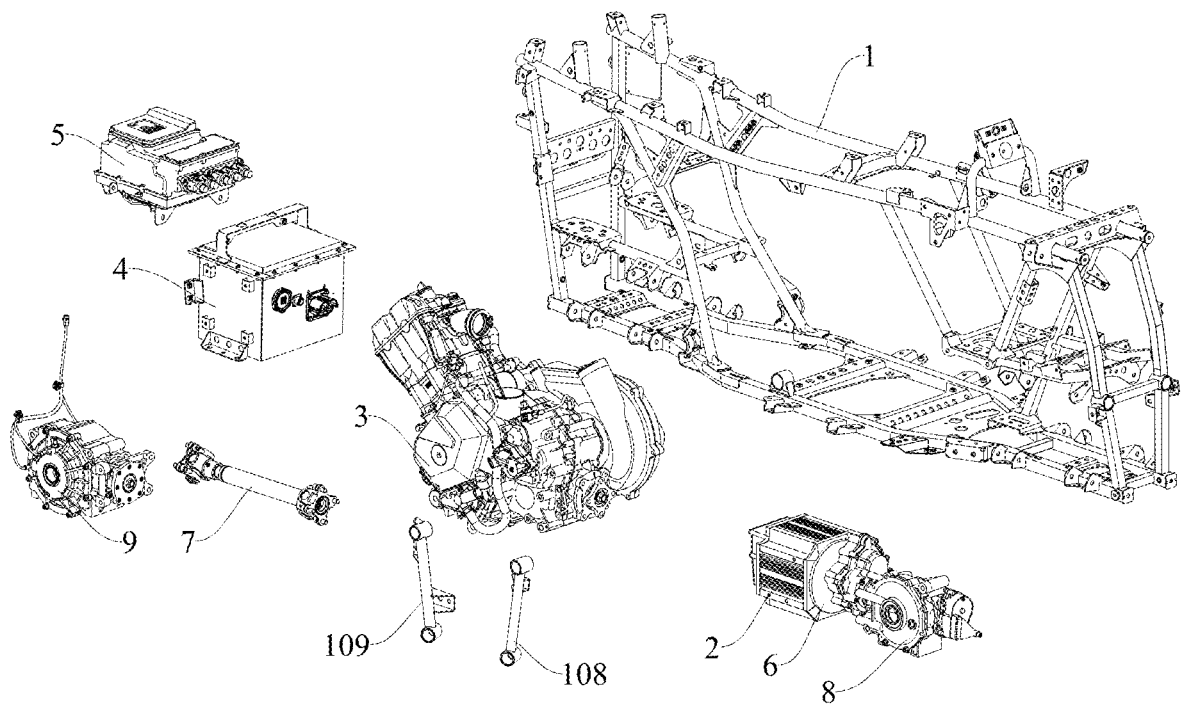
FIG. 2 is an exploded view of an all terrain vehicle according to an embodiment of the present disclosure.

Embodiments of the present disclosure are described in detail below, and examples of the embodiments are illustrated with reference to the accompanying drawings. The embodiments described below with reference to the accompanying drawings are merely exemplary and intended to explain the present disclosure, and shall not be construed as limitation on the present disclosure.

As shown in FIGS. 1-5, the all terrain vehicle according to an embodiment of the present disclosure includes a vehicle frame 1, an engine 3, a power motor 2, a cushion 12, a front wheel 13 and a rear wheel 14. A front end of the vehicle frame 1 is provided with a front axle 8, and a rear end of the vehicle frame 1 is provided with a rear axle 9. The front axle 8 and the rear axle 9 are collectively referred to as axles (also known as vehicle axles), and the front axle 8 and the rear axle 9 are connected to the vehicle frame 1 through a suspension. Both ends of the front axle 8 and the rear axle 9 are configured to mount the front wheel 13 and rear wheel 14, respectively. Each the front axle 8 and the rear axle 9 may be used as a driving axle to drive the vehicle to move, and a steering device is connected to the front axle to control the steering of the all terrain vehicle.

The cushion 12 is arranged on the frame vehicle, the engine 3 and the power motor 2 are arranged on the vehicle frame 1, and the engine 3 is located below the cushion 12. The engine 3 is drivingly connected to one of the front axle 8 and the rear axle 9, and the power motor 2 is drivingly connected to the other of the front axle 8 and the rear axle 9. The present embodiment includes the following two cases: a first case is that the power motor 2 is drivingly connected to the front axle 8, the engine 3 is drivingly connected to the rear axle 9, while a second case is that the power motor 2 is drivingly connected to the rear axle 9, and the engine 3 is drivingly connected to the front axle 8.

It may be understood that the all terrain vehicle in the present embodiment is a hybrid electric vehicle, which is driven by power motor 2 and engine 3 simultaneously, and not only has advantages of good power performance, fast response and long working time of engine 3, but also has advantages of pollution-free and low noise of power motor 2, so as to achieve the best match between engine 3 and power motor 2.

In addition, either or both of the front axle 8 and rear axle 9 of the all terrain vehicle may be used as the driving axle, to achieve a four-wheel drive of the all terrain vehicle. The four-wheel drive may utilize entire weight of the all terrain vehicle as an adhesive pressure, such that adhesive force is significantly increased, and that is to expand traction force limit, so as to greatly improve the off-road performance and handling performance of the all terrain vehicle. Moreover, the all terrain vehicle with four-wheel drive has sufficient power.

The all terrain vehicle according to the embodiment of the present disclosure adopts the power motor 2 and the engine 3 as a driving device to provide power to the front axle 8 and the rear axle 9, respectively. The all terrain vehicle has sufficient power, may carry more weight, and has a better off-road performance and handling performance, which may adapt to more complex terrain environment and has strong practicability.

Preferably, the power motor 2 is located at the front end of the vehicle frame 1 and is drivingly connected to the front axle 8, and the engine 3 is drivingly connected to the rear axle 9. In other words, the front axle 8 is driven by the power motor 2 and the rear axle 9 is driven by the engine 3.

Specifically, the power motor 2 is arranged on a side of a bottom of the vehicle frame 1 adjacent to the front axle 8. An axis of the power motor 2 is parallel to a longitudinal central symmetry plane of the all terrain vehicle. The axis of the power motor refers to an axial direction of an output shaft of the power motor. The engine 3 is arranged between the rear axle 9 and the power motor 2. It may be understood that the power motor 2 is located near the front end of the vehicle frame 1, and the engine 3 is located at a middle position of the vehicle frame 1.

In some embodiments, the all terrain vehicle further includes a gearbox 6 and a transmission shaft 7. The gearbox 6 is arranged at a front side of the power motor 2, an input end of the gearbox 6 is connected to the power motor 2, an output end of the gearbox 6 is connected to the front axle 8, an input end of the transmission shaft 7 is connected to the engine 3, and an output end of the transmission shaft 7 is connected to the rear axle 9.

The gearbox 6 is configured to change speed and torque of power motor 2, and may change a transmission ratio of the output shaft and input shaft in a fixed or a stepwise manner to adapt to the frequently changing driving conditions. The transmission shaft 7 is arranged along a length direction of the vehicle frame 1 to cooperates with the rear axle 9, so as to transmits power of the engine 3 to the rear wheel 14 to drive the vehicle forward.

In some embodiments, the all terrain vehicle further includes a battery 4 and a controller 5, the battery 4 is located on the vehicle frame 1, and the battery 4 is located above the rear axle 9. The battery 4 is configured to supply power to the power motor 2, the controller 5 is connected to the vehicle frame 1 and located above the battery 4.

Both the battery 4 and the controller 5 are connected to the vehicle frame 1. The battery 4 is configured to supply power to the power motor 2, so as to drive the front axle 8 to rotate. The controller 5 is configured to control all parts of the all terrain vehicle to work in a coordinated and consistent manner. The battery 4 is located on top of the rear axle 9 and the controller 5 is located above the battery 4.

In a related art, both the battery 4 and the controller 5 of the all terrain vehicle are arranged at the front end of the vehicle frame 1, resulting in a front-heavy and rear-light of the all terrain vehicle with uneven weight distribution and poor stability of the vehicle. According to the embodiment of the present disclosure, the power motor 2 is placed in front, the engine 3 is located at the middle position of the vehicle frame 1, and both the battery 4 and the controller 5 are located at the rear end of the vehicle frame 1. In this way, the design is reasonable, overall weight of the vehicle frame 1 is evenly distributed, and the stability of the all terrain vehicle is improved.

Figure 3:
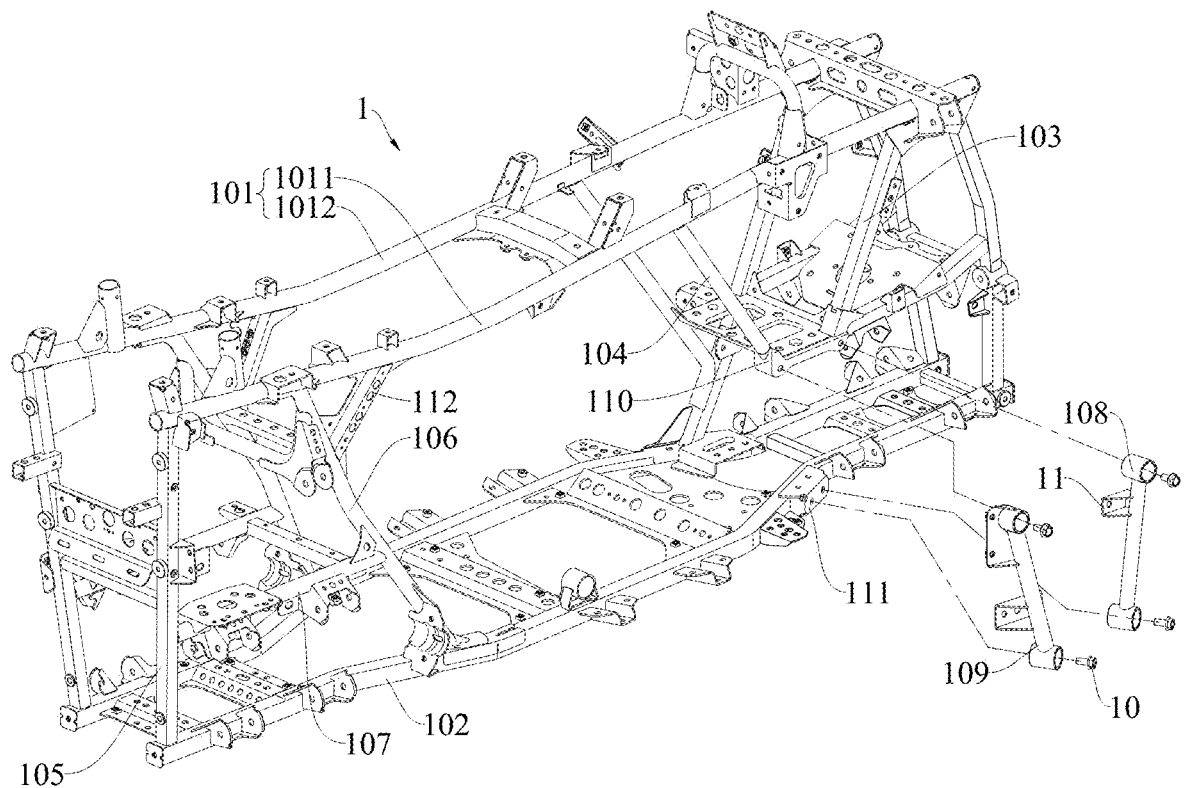
FIG. 3 is a schematic view of a vehicle frame of an all terrain vehicle according to an embodiment of the present disclosure.
Figure 4:
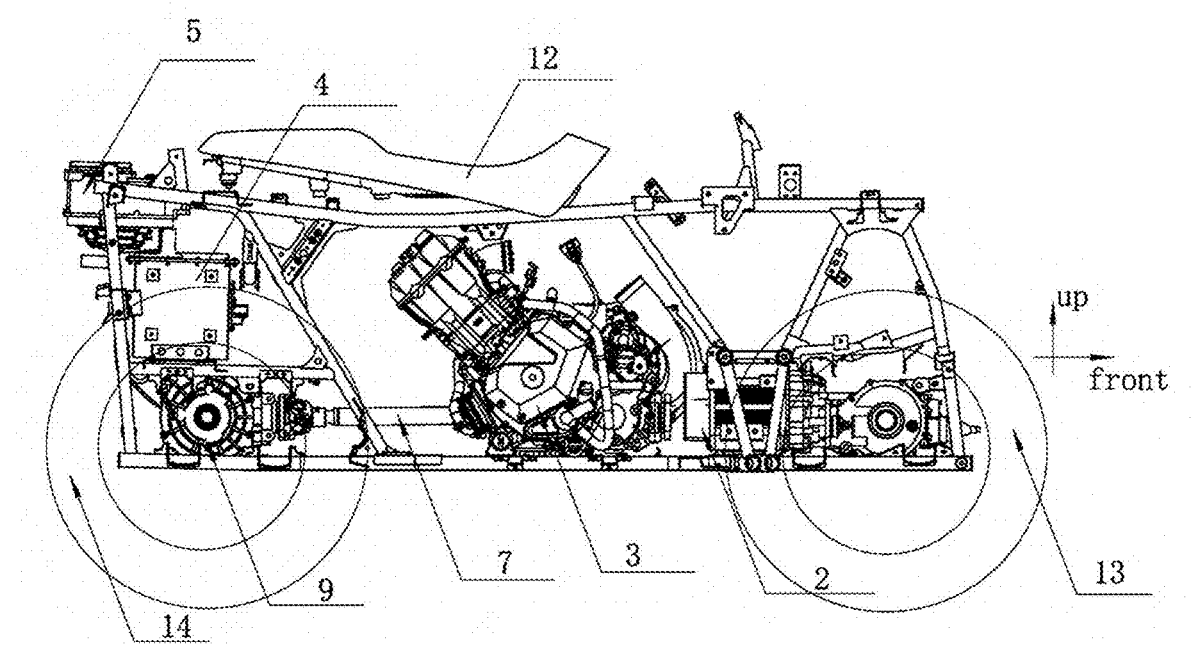
FIG. 4 is a schematic view of an all terrain vehicle according to an embodiment of the present disclosure.
Figure 5:
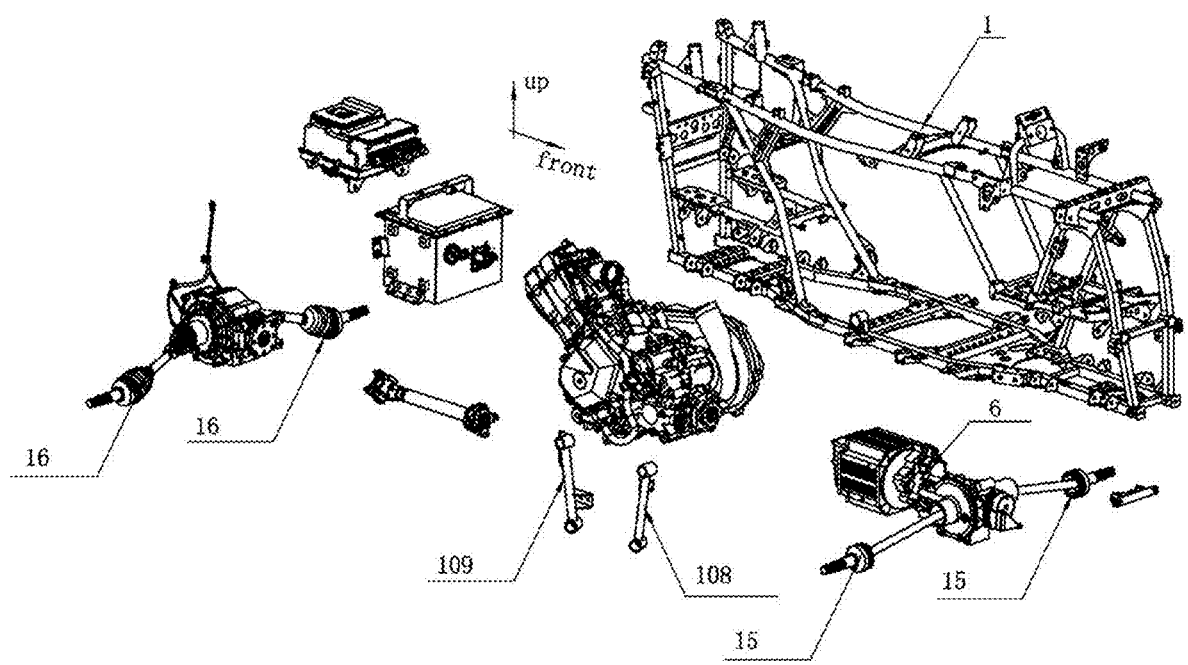
FIG. 5 is an exploded view of an all terrain vehicle according to an embodiment of the present disclosure.

As shown in FIG. 3, in some embodiments, the vehicle frame 1 includes an upper main beam frame 101 and a lower main beam frame 102, and the upper main beam frame 101 and the lower main beam frame 102 are substantially in rectangular shape.

The lower main beam frame 102 is connected to and located below the upper main beam frame 101, and the upper main beam frame 101 and the lower main beam frame 102 form the vehicle frame 1. The vehicle frame 1 is substantially in rectangular shape, and both the power motor 2 and engine 3 are arranged between the upper main beam frame 101 and the lower main beam frame 102.

In some embodiments, the vehicle frame 1 further includes a first connecting beam 103, a second connecting beam 104 and a first connecting seat 110. Upper ends of the first connecting beam 103 and the second connecting beam 104 are connected to the upper main beam frame 101, a lower end of the first connecting beam 103 is connected to a first end of the first connecting seat 110, and a lower end of the second connecting beam 104 is connected to a second end of the first connecting seat 110, and the power motor 2 is located below the first connecting seat 110.

Connections among the first connecting beam 103 and the second connecting beam 104 and the first connecting seat 110 may be detachable or non-detachable connection.

In such arrangement, the lower ends of the first connecting beam 103 and the second connecting beam 104 are connected through the first connecting seat 110, and an open area is defined between the first connecting seat 110 and the lower main beam frame 102. The power motor 2 may enter into the vehicle frame 1 through the open area, which reduces the assembly difficulty of the power motor 2 and the assembly working hours.

It should be noted that the upper main beam frame 101 includes an upper-left main beam and an upper-right main beam connected to the left-upper main beam, the lower main beam frame 102 includes a lower-left main beam and a lower-right main beam connected to the lower-left main beam, and a plurality of connecting beams include a front-left connecting beam, a front-right connecting beam, a rear-left connecting beam, a rear-right connecting beam, and a plurality of vertical beams at both ends. In addition, the connecting beam in the embodiment of the application further includes other tubular structures, such as an oil tank support pipe, located between the upper main beam frame 101 and the lower main beam frame 102. The oil tank support pipe is connected to one of the connecting beams, and the oil tank support pipe is fitted with the connecting beam, which is connected to the oil tank support pipe, to support an oil tank. It may be understood that the connecting beam according to the embodiment of the present disclosure should be understood broadly, which includes all beams and pipes between the upper main beam frame 101 and the lower main beam frame 102. In the present embodiment, the first connecting beam 103 refers to the front-right connecting beam of the vehicle frame 1, and the second connecting beam 104 refers to the oil tank support pipe.

In some embodiments, the vehicle frame 1 further includes a first connecting rod 108 and a second connecting rod 109. An upper end of the first connecting rod 108 is detachably connected to the first connecting seat 110, a lower end of the first connecting rod 108 is detachably connected to the lower main beam frame 102, an upper end of the second connecting rod 109 is detachably connected to the first connecting seat 110, and a lower end of the second connecting rod 109 is detachably connected to the lower main beam frame 102.

In such arrangement, after the power motor 2 is mounted into the vehicle frame 1 through the open area between the first connecting base 110 and the lower main beam frame 102, the open area is closed using the first connecting rod 108 and the second connecting rod 109, and the vehicle frame 1 forms a complete frame structure without affecting structural strength of the vehicle frame 1.

It should be noted that number of connecting rods may be selected according to practical situation rather than in one-to-one correspondence with the connecting beams, that is, there may be one or more connecting beams connected to the first connecting base 110, and there may be one or more connecting rods connected to the connecting base.

The vehicle frame 1 further includes a second connecting seat 111 arranged on the lower main beam frame 102, the lower end of the first connecting rod 108 is detachably connected to the second connecting seat 111, and the lower end of the second connecting rod 109 is detachably connected to the second connecting seat 111. In this way, the second connecting seat 111 may be directly welded to the lower main beam frame 102, and a through hole or other structures may be provided on the second connecting seat 111 to achieve the detachable connection with the connecting rod without affecting structural strength of the lower main beam frame 102.

The vehicle frame 1 further includes a connecting member 10, each of the first connecting seat 110 and the second connecting seat 111 is defined with a threaded hole, each of two ends of the connecting rod is defined with a through hole, the connecting member 10 passes through the through hole and is fitted in the threaded hole such that the first connecting rod 108 and the second connecting rod 109 are detachably connected to the first connecting seat 110 and the second connecting seat 111, respectively. Preferably, the connecting member 10 is a screw. The threaded connection is simple and reliable with convenient assembly and disassembly, which further reduces assembly difficulty.

Furthermore, the first connecting rod 108 and the second connecting rod 109 are also provided with a mounting plate 11, and the mounting plate 11 is located on a side of the connecting rod adjacent to an inner side of the vehicle frame 1 and defined with a mounting hole. The mounting plate 11 is configured to be connected to parts in the vehicle frame 1 to fix the parts and prevent the parts from moving.

In some embodiments, the vehicle frame 1 further includes a third connecting beam 105, an upper end of the third connecting beam 105 is connected to the upper main beam frame 101, a lower end of the third connecting beam 105 is connected to the lower main beam frame 102, and the controller 5 is connected to the upper end of the third connecting beam 105. The third connecting beam 105 refers to a vertical beam located at a rear end of the vehicle frame 1. There are two third connecting beams 105, and the controller 5 is fixed between the two third connecting beams 105.

The vehicle frame 1 further includes a fourth connecting beam 106 and a fifth connecting beam 107, an upper end of the fourth connecting beam 106 is connected to the upper main beam frame 101, a lower end of the fourth connecting beam 106 is connected to the lower main beam frame 102, one end of the fifth connecting beam 107 is connected to the third connecting beam 105, the other end of the fifth connecting beam 107 is connected to the fourth connecting beam 106, the fifth connecting beam 107 is a cross beam arranged horizontally, and the battery 4 is arranged on the fifth connecting beam 107.

The second connecting beam 104 and the fourth connecting beam 106 are arranged at intervals along a length direction of the vehicle frame 1, and the engine 3 is arranged between the second connecting beam 104 and the fourth connecting beam 106.

The steering device includes a handlebar and a steering shaft. The steering shaft is provided with a first end and a second end. The first end of the steering shaft is connected to the front axle, the second end of the steering shaft extends upward and beyond the vehicle frame, and the handlebar is connected to the second end of the steering shaft. When a driver drives the all terrain vehicle, a steering torque may be transmitted to the front axle through the steering shaft by steering the handlebar, so as to control the steering of the all terrain vehicle.

The present disclosure provides another all terrain vehicle according to some embodiments. As shown in FIGS. 1-5, the all terrain vehicle according to the embodiment of the present disclosure includes a vehicle frame 1, a cushion 12, a power motor 2, an engine 3, a front wheel 13, a rear wheel 14, a front-half axle 15 and a rear-half axle 16, the vehicle frame 1 includes an upper main beam frame 101 and a lower main beam frame 102 which are substantially in rectangular shape, and the lower main beam frame 102 is connected to and located below the upper main beam frame 101. The upper main beam frame 101 and the lower main beam frame 102 form the vehicle frame 1.

A front end of the vehicle frame 1 is provided with a front axle 8, and a rear end of the vehicle frame 1 is provided with a rear axle 9. The front axle 8 and the rear axle 9 are collectively referred to as axles (also known to as vehicle axles). The front axle 8 and the rear axle 9 are connected to the vehicle frame 1 through a suspension. Both ends of the front axle 8 and the rear axle 9 are configured to mount the wheels. The front-half axle 15 is connected between the front axle 8 and the front wheel 13, the rear-half axle 16 is connected between the rear axle 9 and the rear wheel 14, and both the front axle 8 and the rear axle 9 may be used as a driving axle to drive the vehicle to move.

The all terrain vehicle in this embodiment is a hybrid electric vehicle, which is driven by power motor and engine simultaneously, and not only has advantages of good power performance, fast response and long working time of engine, but also has advantages of pollution-free and low noise of power motor 2, so as to achieve the best match between engine 3 and power motor 2.

In the present embodiment, the front axle 8 is driven by the power motor 2, and the rear axle 9 is driven by the engine 3. The power motor 2 is located on the lower main beam frame 102 and in front of the cushion 12, and that is, the power motor 2 is located on a side adjacent to the front axle 8, the engine 3 is located on the lower main beam frame 102 and below the cushion 12, and that is, the engine 3 is located between the rear axle 9 and the power motor 2. It may be understood that, the power motor 2 is located near the front end of the vehicle frame 1, and the engine 3 is located at a middle position of the vehicle frame 1.

According to the all terrain vehicle of the embodiment of the present disclosure, the power motor 2 is placed in front and located in front of the cushion 12, the engine 3 is located at the middle position of the vehicle frame 1 and located below the cushion 12. In this way, the design is reasonable, overall weight of the vehicle frame 1 is evenly distributed, and the stability of the all terrain vehicle is improved.

In some embodiments, the connecting beam includes a fourth connecting beam 106 and a third connecting beam 105 located behind the engine 3. An upper end of the fourth connecting beam 106 is connected to the upper main beam frame 101, a lower end of the fourth connecting beam 106 is connected to the lower main beam frame 102, an upper end of the third connecting beam 105 is connected to the upper main beam frame 101, and a lower end of the third connecting beam 105 is connected to the lower main beam frame 102, and the rear axle 9 is located between the fourth connecting beam 106 and the third connecting beam 105.

A fifth connecting beam 107 is arranged between the fourth connecting beam 106 and the third connecting beam 105, one end of the fifth connecting beam 107 is connected to the third connecting beam 105, the other end of the fifth connecting beam 107 is connected to the fourth connecting beam 106, the fifth connecting beam 107 is a cross beam arranged horizontally, and the fifth connecting beam 107 is located above the rear axle 9. The all terrain vehicle further includes a battery 4, the battery 4 is configured to supply power the power motor 2, so as to drive the front axle 8 to rotate. The battery 4 is arranged on the fifth connecting beam 107. It should be noted that there are two fourth connecting beams 106 and two third connecting beams 105, which a are arranged at intervals along a width direction of the all terrain vehicle, respectively.

A reinforcing member 112 is provided between the upper main beam frame 101 and the fourth connecting beam 106. Specifically, there is an included angle between the upper main beam frame 101 and the fourth connecting beam 106. One end of the reinforcing member 112 is connected to the upper main beam frame 101, and the other end of the reinforcing member 112 is connected to the fourth connecting beam 106. In this way, the upper main beam frame 101, the fourth connecting beam 106 and the reinforcing member 112 form a triangular structure, which may further strengthen the overall strength of the vehicle frame 1.

The upper main beam frame 101 includes a first longitudinal beam 1011 and a second longitudinal beam 1012 which extend along a longitudinal direction of the all terrain vehicle, and the all terrain vehicle further includes a controller 5 configured to control all parts of the all terrain vehicle to work in a coordinated and consistent manner. The controller 5 is provided between the first longitudinal beam 1011 and the second longitudinal beam 1012, and is located above the battery 4, and projections of the battery 4 and the controller 5 are at least partially coincident in a vertical direction.

In some embodiments, the power motor 2 is located in front of the engine 3 and behind the front axle 8. The all terrain vehicle further includes a gearbox 6 between the power motor 2 and the front axle 8, an input end of the gearbox 6 is connected to the power motor 2, an output end of gearbox 6 is connected to a front axle 8, and the gearbox 6 is configured to change speed and torque of power motor 2, and may change a transmission ratio of the output shaft and input shaft in a fixed or a stepwise manner to adapt to the frequently changing driving conditions.

In some embodiments, a housing of the power motor 2 is fixed with a housing of the gearbox 6, and the housing of gearbox 6 is fixed with the housing of front axle 8. In such arrangement, the power motor 2, the gearbox 6 and the front axle 8 are integrally arranged, which may save space and reduce assembly difficulty.

In some embodiments, the all terrain vehicle further includes a transmission shaft 7, the transmission shaft 7 is arranged along a length direction of the vehicle frame 1, an input end of transmission shaft 7 is connected to the engine 3, and an output end of transmission shaft 7 is connected to the rear axle 9. The transmission shaft 7 cooperates with the rear axle 9, so as to transmits power of the engine 3 to the rear wheel 14 to drive the vehicle forward.

The fourth connecting beam 106 is located in front of the third connecting beam 105, and projections of the fourth connecting beam 106 and the transmission shaft 7 are at least partially coincident on a longitudinal central symmetry plane of the all terrain vehicle. In other words, the projections of the fourth connecting beam 106 and the transmission shaft 7 intersects in a longitudinal direction of the all terrain vehicle, such that the fourth connecting beam 106 may better protect the transmission shaft 7.

In some embodiments, the vehicle frame 1 further includes a first connecting beam 103, a second connecting beam 104 and a first connecting seat 110 which are located at a front side of the engine 3. Upper ends of the first connecting beam 103 and the second connecting beam 104 are connected to the upper main beam frame 101, a lower end of the first connecting beam 103 is connected to a first end of the first connecting seat 110, and a lower end of the second connecting beam 104 is connected to a second end of the first connecting seat 110, and the power motor 2 is arranged below the first connecting base 110.

Connections among the first connecting beam 103 and the second connecting beam 104 and the first connecting seat 110 may be detachable or non-detachable connection.

The all terrain vehicle further includes an oil tank (not shown), and the first connecting seat 110 is configured to support the oil tank.

In some embodiments, the vehicle frame 1 further includes a first connecting rod 108 and a second connecting rod 109. An upper end of the first connecting rod 108 is detachably connected to the first connecting seat 110, a lower end of the first connecting rod 108 is detachably connected to the lower main beam frame 102, an upper end of the second connecting rod 109 is detachably connected to the first connecting seat 110, and a lower end of the second connecting rod 109 is detachably connected to the lower main beam frame 102. When the first connecting rod 108 and the second connecting rod 109, the first connecting seat 110 and the lower main beam frame 102 are in a detached state, an open area is defined between the first connecting seat 110 and the lower main beam frame 102, and the power motor 2 may enter into the vehicle frame 1 through the open area, which reduces the assembly difficulty of the power motor 2 and reduces the assembly working hours.

In such arrangement, after the power motor 2 is mounted into the vehicle frame 1 through the open area between the first connecting base 110 and the lower main beam frame 102, the open area is closed using the first connecting rod 108 and the second connecting rod 109, and the vehicle frame 1 forms a complete frame structure without affecting structural strength of the vehicle frame 1.

It should be noted that number of connecting rods may be selected according to practical situation rather than in one-to-one correspondence with the connecting beams, that is, there may be one or more connecting beams connected to the first connecting base 110, and there may be one or more connecting rods connected to the connecting base.

The vehicle frame 1 further includes a second connecting seat 111 arranged on the lower main beam frame 102, the lower end of the first connecting rod 108 is detachably connected to the second connecting seat 111, and the lower end of the second connecting rod 109 is detachably connected to the second connecting seat 111. In this way, the second connecting seat 111 may be directly welded to the lower main beam frame 102, and a through hole or other structures may be provided on the second connecting seat 111 to achieve the detachable connection with the connecting rod without affecting structural strength of the lower main beam frame 102.

Projections of the first connecting rod 108 and the second connecting rod 109 in the longitudinal central symmetry plane of the all terrain vehicle at least partially coincide with a projection of the power motor 2 on the longitudinal central symmetry plane of the all terrain vehicle. In other words, the first connecting rod 108 and the second connecting rod 109 are located on outer side of the power motor 2, and connection positions of the first connecting rod 108 and the second connecting rod 109 with the first connecting base 110 are not lower than a highest point of the power motor 2. Thus, the first connecting rod 108 and the second connecting rod 109 may protect the power motor 2 and facilitate the disassembly and assembly of the power motor 2.

The vehicle frame 1 further includes a connecting member 10, each of the first connecting seat 110 and the second connecting seat 111 is defined with a threaded hole, each of two ends of the connecting rod is defined with a through hole, the connecting member 10 passes through the through hole and is fitted in the threaded hole such that the first connecting rod 108 and the second connecting rod 109 are detachably connected to the first connecting seat 110 and the second connecting seat 111, respectively. Preferably, the connecting member 10 is a screw. The threaded connection is simple and reliable with convenient assembly and disassembly, which further reduces assembly difficulty.

Furthermore, the first connecting rod 108 and the second connecting rod 109 are also provided with a mounting plate 11, and the mounting plate 11 is located on a side of the connecting rod adjacent to an inner side of the vehicle frame 1 and defined with a mounting hole. The mounting plate 11 is configured to be connected to parts in the vehicle frame 1 to fix the parts and prevent the parts from moving.

In the description of the present disclosure, it should be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation or position relationship according to the orientation or position relationship shown in the drawings, which are for convenience and simplicity of description and do not indicate or imply that the devices or elements referred to have a particular orientation and be constructed or operated in a particular orientation. Thus, these terms shall not be construed as limitation on the present disclosure.

In addition, terms such as "first" and "second" are used herein for purposes of description and are not intended to indicate or imply relative importance or significance or to imply the number of indicated technical features. Thus, the feature defined with "first" and "second" may explicitly or implicitly comprise at least one of the features. In the description of the present disclosure, the term "a plurality of" means at least two, such as two, three, etc., unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections or communicate with each other; may also be direct connections or indirect connections via intervening structures; may also be inner communication or interaction of two elements, which may be understood by those skilled in the art according to specific situations.

In the present disclosure, unless specified or limited otherwise, a first feature is "on" or "below" a second feature may include the first feature in direct contact with the second feature, or the first feature and the second feature contacted via an intermediate media. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the above terms throughout this specification are not necessarily referring to the same embodiment or example of the present disclosure. Furthermore, the particular features, structures, materials, or characteristics may be combined in any suitable manner in one or more embodiments or examples. Moreover, those skilled in the art may integrate and combine the different embodiments or examples and the features of the different embodiments or examples described in this specification without contradicting each other.

Although embodiments of the present disclosure have been shown and described, it may be appreciated by those skilled in the art that the above embodiments are merely exemplary and are not intended to limit the present disclosure, and various changes, modifications, alternatives and variations may be made in the embodiments within the scope of the present disclosure.

What is claimed is:

1. An all terrain vehicle, comprising:
   a vehicle frame comprising an upper main beam frame, a lower main beam frame and a connecting beam connected between the upper main beam frame and the lower main beam frame, the connecting beam comprising a second connecting beam and a fourth connecting beam, the second connecting beam and the fourth connecting beam being arranged at intervals along a length direction of the vehicle frame, the second connecting beam being located in front of the fourth connecting beam, a front end of the vehicle frame being provided with a front axle, and a rear end of the vehicle frame being provided with a rear axle;
   a cushion arranged on the frame vehicle;
   an engine arranged on the vehicle frame and located below the cushion;
   a power motor arranged on the vehicle frame, the engine being drivingly connected to one of the front axle and the rear axle, the power motor being drivingly connected to the other of the front axle and the rear axle;
   a front wheel and a rear wheel, the front wheel being connected to the front axle, and the rear wheel being connected to the rear axle,
   wherein the engine is arranged between the second connecting beam and the fourth connecting beam, and at least a part of the power motor is located in front of the second connecting beam.

2. The all terrain vehicle according to claim 1, wherein the power motor is located at a front end of the vehicle frame and drivingly connected to the front axle, and the engine is drivingly connected to the rear axle.

3. The all terrain vehicle according to claim 2, further comprising a gearbox arranged at a front side of the power motor, an input end of the gearbox being connected to an output end the power motor, and an output end of the gearbox being connected to the front axle.

4. The all terrain vehicle according to claim 1, further comprising a transmission shaft, an input end of the transmission shaft being connected to the engine, and an output end of the transmission shaft being connected to the rear axle.

5. The all terrain vehicle according to claim 1, further comprising a battery located on the vehicle frame and located above the rear axle; and
a controller connected to the vehicle frame and located above the battery.

6. The all terrain vehicle according to claim 1, wherein the vehicle frame comprises an upper main beam frame and a lower main beam frame, the lower main beam frame is connected to and located below the upper main beam frame, and both the power motor and engine are arranged between the upper main beam frame and the lower main beam frame.

7. The all terrain vehicle according to claim 6, wherein the vehicle frame further comprises a first connecting beam, a second connecting beam and a first connecting seat, upper end of the first connecting beam and upper end of the second connecting beam are connected to the upper main beam frame, a lower end of the first connecting beam is connected to the first connecting seat, a lower end of the second connecting beam is connected to the first connecting seat, and the power motor is located below the first connecting seat.

8. The all terrain vehicle according to claim 7, wherein the vehicle frame further comprises a first connecting rod and a second connecting rod, an upper end of the first connecting rod is detachably connected to the first connecting seat, a lower end of the first connecting rod is detachably connected to the lower main beam frame, an upper end of the second connecting rod is detachably connected to the first connecting seat, and a lower end of the second connecting rod is detachably connected to the lower main beam frame.

9. The all terrain vehicle according to claim 7, wherein an axis of the power motor is parallel to a longitudinal central symmetry plane of the all terrain vehicle.

10. An all terrain vehicle, comprising:
a vehicle frame comprising an upper main beam frame, a lower main beam frame and a connecting beam connected between the upper main beam frame and the lower main beam frame, the connecting beam comprising a second connecting beam and a fourth connecting beam, the second connecting beam and the fourth connecting beam being arranged at intervals along a length direction of the vehicle frame, the second connecting beam being located in front of the fourth connecting beam, a front end of the vehicle frame being provided with a front axle, and a rear end of the vehicle frame being provided with a rear axle;
a cushion being provided on the upper main beam frame;
an engine located on the lower main beam frame and below the cushion, and the engine being drivingly connected to the rear axle;
a power motor provided on the lower main beam frame and located in front of the cushion, the power motor being drivingly connected to the front axle;
a front wheel and a rear wheel configured to support the vehicle frame;
a front-half axle and a rear-half axle, the front-half axle being connected between the front axle and the front wheel, the rear-half axle being connected between the rear axle and the rear wheel,
wherein the engine is arranged between the second connecting beam and the fourth connecting beam, and at least a part of the power motor is located in front of the second connecting beam.

11. The all terrain vehicle according to claim 10, wherein the connecting beam comprises a fourth connecting beam and a third connecting beam located behind the engine, the rear axle is located between the fourth connecting beam and the third connecting beam;
a fifth connecting beam is arranged between the fourth connecting beam and the third connecting beam, the fifth connecting beam is located above the rear axle;
the all terrain vehicle further comprises a battery arranged on the fifth connecting beam.

12. The all terrain vehicle according to claim 11, wherein the upper main beam frame comprises a first longitudinal beam and a second longitudinal beam extending along a longitudinal direction of the all terrain vehicle;
the all terrain vehicle further comprises a controller, the controller is provided between the first longitudinal beam and the second longitudinal beam and located above the battery.

13. The all terrain vehicle according to claim 12, wherein projections of the battery and the controller are at least partially coincident in a vertical direction.

14. The all terrain vehicle according to claim 11, further comprising a transmission shaft, an input end of transmission shaft being connected to the engine, and an output end of transmission shaft being connected to the rear axle;
the fourth connecting beam being located in front of the third connecting beam, and projections of the fourth connecting beam and the transmission shaft being at least partially coincident on a longitudinal central symmetry plane of the all terrain vehicle.

15. The all terrain vehicle according to claim 11, wherein a reinforcing member is provided between the upper main beam frame and the fourth connecting beam.

16. The all terrain vehicle according to claim 10, wherein the power motor is located in front of the engine and behind the front axle;
the all terrain vehicle further comprises a gearbox located between the power motor and the front axle, an input end of the gearbox is connected to the power motor, an output end of gearbox is connected to a front axle;
a housing of the power motor is fixed with a housing of the gearbox, and the housing of gearbox is fixed with the housing of front axle.

17. The all terrain vehicle according to claim 10, wherein the vehicle frame further comprises a first connecting beam, a second connecting beam and a first connecting seat connected between the first connecting beam and the second connecting beam, the first connecting beam and the second connecting beam are located at a front side of the engine, upper end of the first connecting beam and upper end of the second connecting beam are connected to the upper main beam frame, a lower end of the first connecting beam is connected to the first connecting seat, a lower end of the second connecting beam is connected to the first connecting seat, and the power motor is arranged below the first connecting base.

18. The all terrain vehicle according to claim 17, wherein the vehicle frame further comprises a first connecting rod and a second connecting rod, upper end of the first connecting rod and upper end of the second connecting rod are detachably connected to the first connecting seat, lower end of the first connecting rod and lower end of the second connecting rod are detachably connected to the lower main beam frame.

19. The all terrain vehicle according to claim 18, wherein the vehicle frame further comprises a second connecting seat arranged on the lower main beam frame, the lower end of the first connecting rod is detachably connected to the second connecting seat, and the lower end of the second connecting rod is detachably connected to the second connecting seat.

20. The all terrain vehicle according to claim 18, wherein projections of the first connecting rod and the second connecting rod in the longitudinal central symmetry plane of the all terrain vehicle at least partially coincide with a projection of the power motor on the longitudinal central symmetry plane of the all terrain vehicle; or connection positions of the first connecting rod and the second connecting rod with the first connecting base are not lower than a highest point of the power motor.

\* \* \* \* \*